United States Patent [19]

Hutchins et al.

[11] Patent Number: 4,470,301

[45] Date of Patent: Sep. 11, 1984

[54] PROBE AND DRAIN ASSEMBLY FOR FUEL OIL/WATER SEPARATOR

[75] Inventors: Charles K. Hutchins; Donald I. Thornton; Richard H. Peyton, all of East Providence, R.I.

[73] Assignee: Fram Corporation, East Providence, R.I.

[21] Appl. No.: 421,656

[22] Filed: Sep. 22, 1982

[51] Int. Cl.³ .................... B01D 27/10; G01F 23/24
[52] U.S. Cl. ............................... 73/304 R; 210/114; 340/620
[58] Field of Search ............... 210/86; 73/304 R, 308

[56] References Cited

U.S. PATENT DOCUMENTS

| 3,317,042 | 5/1967 | Botstiber | 210/86 |
| 3,932,853 | 1/1976 | Cannon | 210/91 X |
| 3,960,726 | 6/1976 | Peterson | 210/86 X |
| 4,276,161 | 6/1981 | Matsui et al. | 210/86 |
| 4,321,136 | 3/1982 | Matsui | 210/86 |
| 4,390,793 | 6/1983 | John | 73/304 R X |

Primary Examiner—Daniel M. Yasich
Attorney, Agent, or Firm—Ken C. Decker; William N. Antonis

[57] ABSTRACT

A probe and sump drain assembly (128) includes a fitting (136) secured to the wall of a sump (98) to which a probe housing 146 is threadedly engaged. The fitting is provided with a stepped bore having larger (142) and smaller (140) diameter portions. Seals (154, 156) carried on the housing (146) control fluid communication through passages (160, 162) communicated with the larger portion (142). A ring terminal assembly (170) provides an electrical connection with the fitting (136) and with a transversely projecting portion (166) of the probe (144) regardless of the angular orientation of the portion (166) of the probe (144).

6 Claims, 6 Drawing Figures

PROBE AND DRAIN ASSEMBLY FOR FUEL OIL/WATER SEPARATOR

This invention relates to a combination sump drain and probe assembly for a separating device, and is particularly useful for warning a vehicle operator when the water level in the sump of a diesel fuel oil/water separator attains a high level.

Probe and sump drain assemblies have been proposed before. They are of the type which comprise a fitting attached to a sump wall, a probe assembly engaged with the fitting and comprising an electrically conductive probe and an insulating housing, a fluid passage through the housing for providing a fluid flowpath through the assembly from the sump, and a terminal assembly for providing an electrical connection with the probe. This type of probe assembly is shown, for example, in U.S. Pat. No. 4,276,161, issued on June 30, 1981 to Matsui. The construction disclosed in the Matsui patent has the disadvantage in that the probe assembly must be entirely removed from the separator in order to drain the sump or when the cartridge is replaced, and requires tools to remove the probe assembly from the cartridge. Since removal of the probe to drain the sump is relatively difficult, the vehicle operator may fail to drain the probe when appropriate.

The present invention avoids the drawbacks of the prior art by providing a terminal assembly which provides an electrical connection with the probe regardless of the angular position thereof, so that the probe drain can be loosened to permit the fluid in the sump to drain and may be easily removed when the cartridge is changed. Accordingly, the present invention has the advantage of permitting the sump to be easily drained, without the use of tools. The present invention also has the advantage of permitting easy removal of the entire drain and probe assembly when the cartridge is changed, so that the probe assembly may be easily reinstalled on a new cartridge.

The present invention is characterized by a terminal assembly including a portion circumscribing the probe assembly, an electrical lead carried by the portion circumscribing the probe assembly, and contact means carried by the circumscribing portion for providing an electrical connection between the lead and the probe while permitting relative rotation between the probe assembly and the terminal.

Although a specific embodiment of the invention has been disclosed herein, the scope of the invention is not limited thereto, and many variations of the concepts disclosed herein are possible. Accordingly, the scope of the invention is limited only by the scope of the appending claims.

Figure 1:
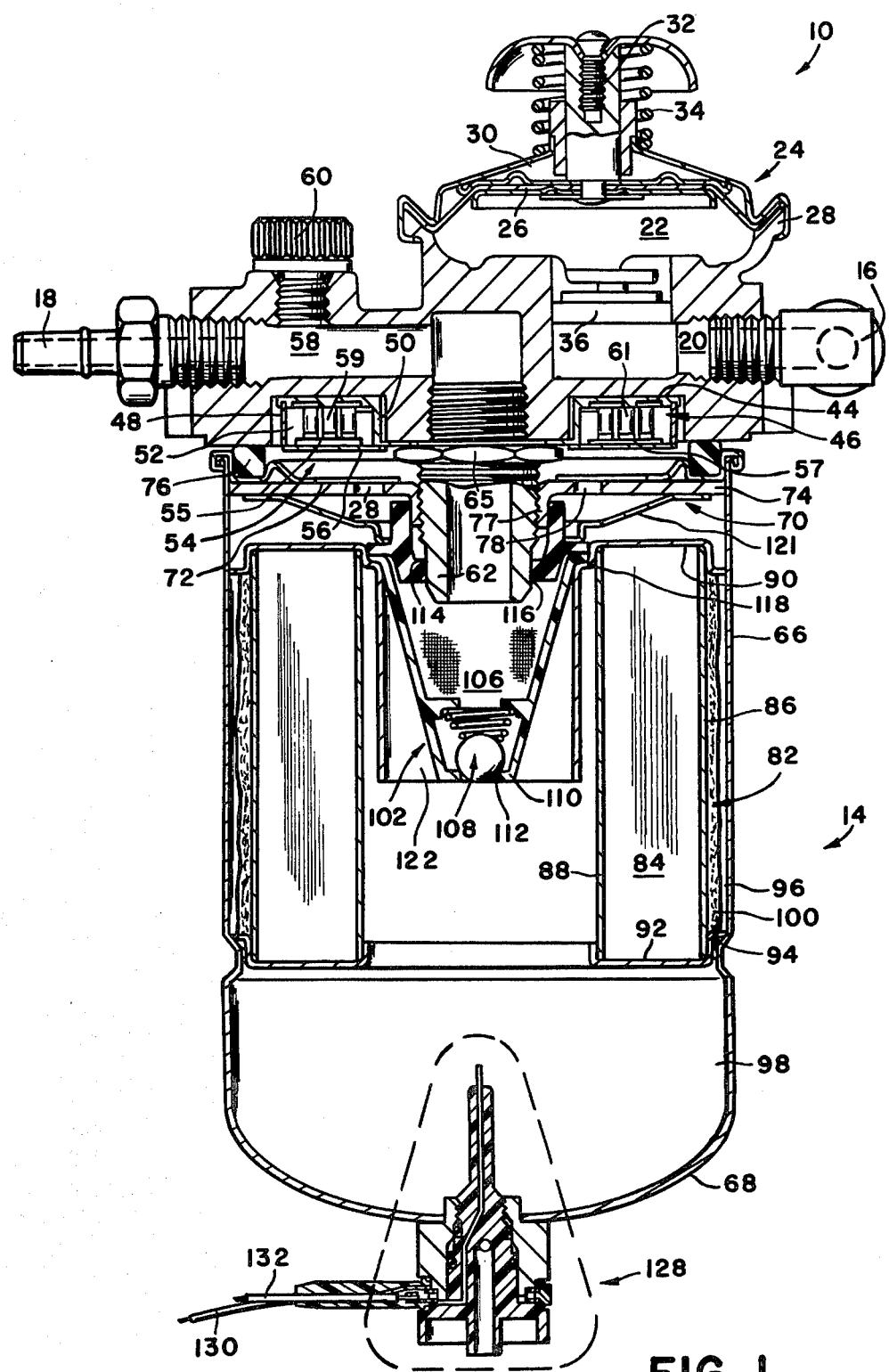
FIG. 1 is a longitudinal cross-sectional view of a separating device made pursuant to the teachings of our present invention, taken substantially along lines 1—1 of FIG. 2.
Figure 2:
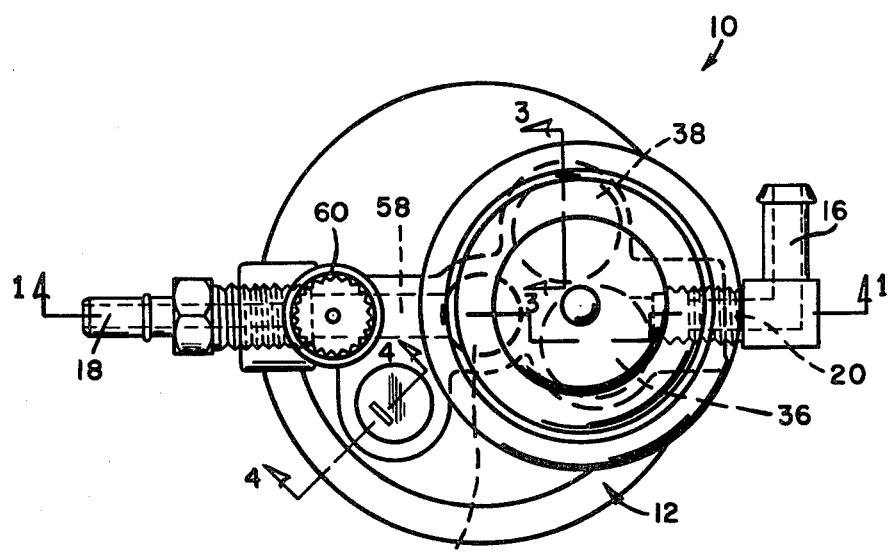
FIG. 2 is a top plan view of a separator made pursuant to the teachings of our present invention.
Figure 3:
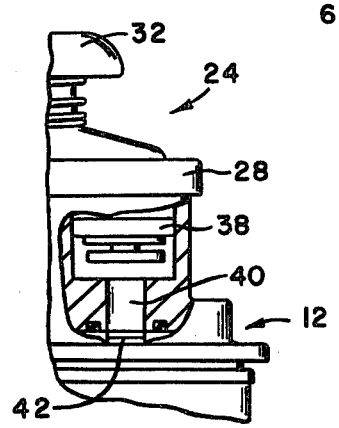
FIG. 3 is a fragmentary partial cross-sectional view taken substantially along lines 3—3 of FIG. 2.

Referring now to the drawings, a separator device for separating an immiscible component from a fluid mixture, such as separating water from diesel fuel oil in the fuel supply system of an automobile equipped with a diesel engine, is indicated generally by the numeral 10. Separating device 10 includes a housing or mount 12, which is secured, for example, to an automotive vehicle, and a replaceable separator cartridge generally indicated by the numeral 14 which is carried on the housing 12 and which is replaceable at normal maintenance intervals. The housing 12 is provided with an inlet fitting 16 and an outlet fitting 18 for connection in the aforementioned fuel supply system for a motor vehicle. The inlet fitting 16 communicates with an inlet passage 20 which communicates fluid from the inlet fitting 16 into the pumping chamber 22 of a hand operated primer pump generally indicated by the numeral 24. A oneway check valve 36 permits fluid communication from the inlet fitting 16 into the pumping chamber 22, but prevents communication in the reverse direction.

The primer pump 24 includes a pumping diaphragm 26 which is sealingly secured at its outer periphery to circumferentially extending portion 28 of the housing 12. The diaphragm 26 separates the pumping chamber 22 from a vented chamber 30. A reciprocally mounted, hand operated plunger 32 is secured to the diaphragm 26 and is adapted to move the latter toward and away from the housing 12 when the plunger 32 is operated. A spring 34 yieldably urges the plunger 32 upwardly viewing the figure. A check valve assembly 36 permits communication of liquid mixture into the pumping chamber 22 from the inlet fitting 16, but prevents communication in the reverse direction. A second check valve 38 permits communication from the pumping chamber 22 into a passage portion 40 downstream of the pumping chamber 22, but prevents communication in the reverse direction.

Passage portion 40 communicates liquid through an opening (not shown) 42 in top portion 44 of an annular heating element 46. Heating element 46 also includes annular side portions 48, 50 and a bottom portion 56 which cooperate with the portion 44 to define an annular duct 52 through which the liquid is communicated. The bottom portion 56 is provided with an opening (not shown) which permits fluid to communicate from the duct 52 into the annular chamber 54. A pair of circumferentially spaced discs 55,57 are installed in the duct 52 and are held against the bottom portion 56 by leaf springs 59, 61. Discs 55, 57 are available commercially and are made from a Positive Temperature Coefficient (PTC), electrically resistive material.

The outlet fitting 18 communicates with a passage 58 within the housing 12. A manually operable vent 60 is opened to vent the passage 58 when the cartridge 14 is initially charged with liquid. Operation of the primer pump 24 pressurizes the system to move liquid from the inlet fitting 16 to the outlet fitting 18 while purging the air which is displaced by the liquid through the vent 60, as will be more completely described hereinafter. The passage 58 terminates in a threaded stud 62 on which the removable cartridge 14 may be engaged. The bottom portion 56 of element 46 is fastened on the stud 60 by a nut 65.

The cartridge 14 comprises a casing 66 having a closed end 68 and an opposite open end. The open end of the casing 66 is closed by a reinforced bottom or tapping plate 70. The tapping plate 70 comprises a lightweight portion 72 which is crimped to the periphery of the open end of the casing 66 in a manner common in the art, and also includes a heavier portion 74 which is fastened to the lighter portion 72. A circumferentially extending seal 76 is retained in the groove on the lighter portion 72 and provides a sealing connection between the casing 66 and the housing 12 when the cartridge 14 is installed thereon. The heavier plate 74 includes an axially extending portion 77 which is threaded to engage the stud 62 when the cartridge 14 is installed on the housing 12. The tapping plate 70 is provided with a number of circumferentially spaced openings 78 which communicate fluid from the annular chamber 54 into the casing 66.

Mounted in the casing 66 is a coalescing medium generally indicated by the numeral 82 which comprises a conventional circumferentially extending array of radially tapering pleats of paper 84. Coalescing medium 82 also includes an outer support member or screen 86, an inner support member or screen 88, an upper end cap 90, and a lower end cap 92. The lower end cap 92 is sealed to the walls of the casing 66 by a circumferentially extending seal 94, to thereby prevent fluid communication between a chamber 96 defined by the medium 82 and the wall of the casing 66 and a sump 98 defined by the end cap 92, the seal 94 and the bottom wall 68 of the casing 66. The coalescing medium 82 also includes a circumferentially extending batt of a conventional fibrous filtering medium 100. The fibrous filtering medium 100 circumscribes the outer screen 86 and is comprised of randomly arrayed non-woven fibers having a density much less than the density of the pleated paper medium 84.

Mounted coaxially within the coalescing medium 82 is a conically-shaped separating medium generally indicated by the numeral 102. The separating medium 102 comprises circumferentially spaced supports 104 upon which a conventional separating membrane 106 is mounted. The separating medium 102 tapers towards the sump 98, so that water droplets coalesced by the coalescing medium 82 and separated out by the membrane 106 are permitted to fall down into the sump 98 due to the conical shape of the separating medium 102. The separating medium 102 is coaxial with the stud 62 so that liquid flowing through the membrane 106 may also flow upwardly through the stud 62 into the passage 58. A relief valve generally indicated by the numeral 108 is mounted in the tip 110 of the medium 102, and opens to permit liquid flow through the passage 112 in the tip of the separating medium 102 when the pressure differential across the membrane 106 exceeds a predetermined level.

A circumferentially extending seal 114 circumscribes the stud 62 and includes a portion 116 which projects into the larger diameter end of the conical separating medium 102, to provide a sealing connection with the stud 62. The seal 114 also engages with the threaded portion 77 of the plate 74, and still another portion 118 is clamped between the upper circumferential surface of the conical separating medium 102, and the end cap 90 by a spring member 121. A circumferentially extending baffle 122 projects downwardly from the upper end cap 90 and is coaxial both with the inner screen 88 and with the separating medium 102. The baffle 122 is impervious to liquid flow.

Figure 4:
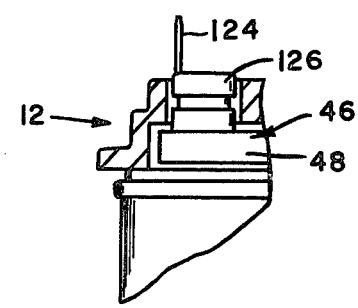
FIG. 4 is a fragmentary cross-sectional view taken substantially along lines 4—4 of FIG. 2.

Two electrical connections are necessary with respect to the separating device 10. The discs 55, 57 are supplied with electrical energy through a terminal 124 (FIG. 4) which projects from the top of the housing 12 and is connected to a portion 126 extending from the upper part 44 of the heating element 46. The casing 66 is also provided with a combination drain for the sump 98 and warning probe assembly generally indicated by the numeral 128. A pair of conductors 130, 132 connects the probe assembly 128 with electrical ground and with a warning light on the vehicle dashboard respectively to thereby indicate, as will be more completely described hereinafter, that the sump 98 contains water and should be drained.

Figure 6:
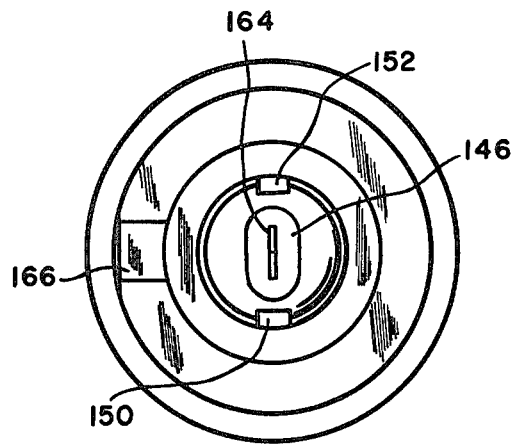
FIG. 6 is a view taken substantially along lines 6—6 of FIG. 5 illustrating the tip and body portions of the probe assembly.

The probe assembly 128 includes an annular fitting 136 secured to the bottom of the sump 98 and defining a stepped bore 138 therewithin having a smaller diameter portion 140 and a larger diameter portion 142. An electrically conductive probe 144 is carried in an insulative housing 146 which insulates the probe 44 from the fitting 136. The housing 146 is threaded as at 148 to threadedly engage a corresponding threaded portion on the fitting 136. The threaded portion 148 is interrupted by circumferentially spaced drain slots 150, 152 which are most clearly shown on FIG. 6, and which extend axially through the threaded portion 148 to permit fluid to drain as will be hereinafter described.

Figure 5:
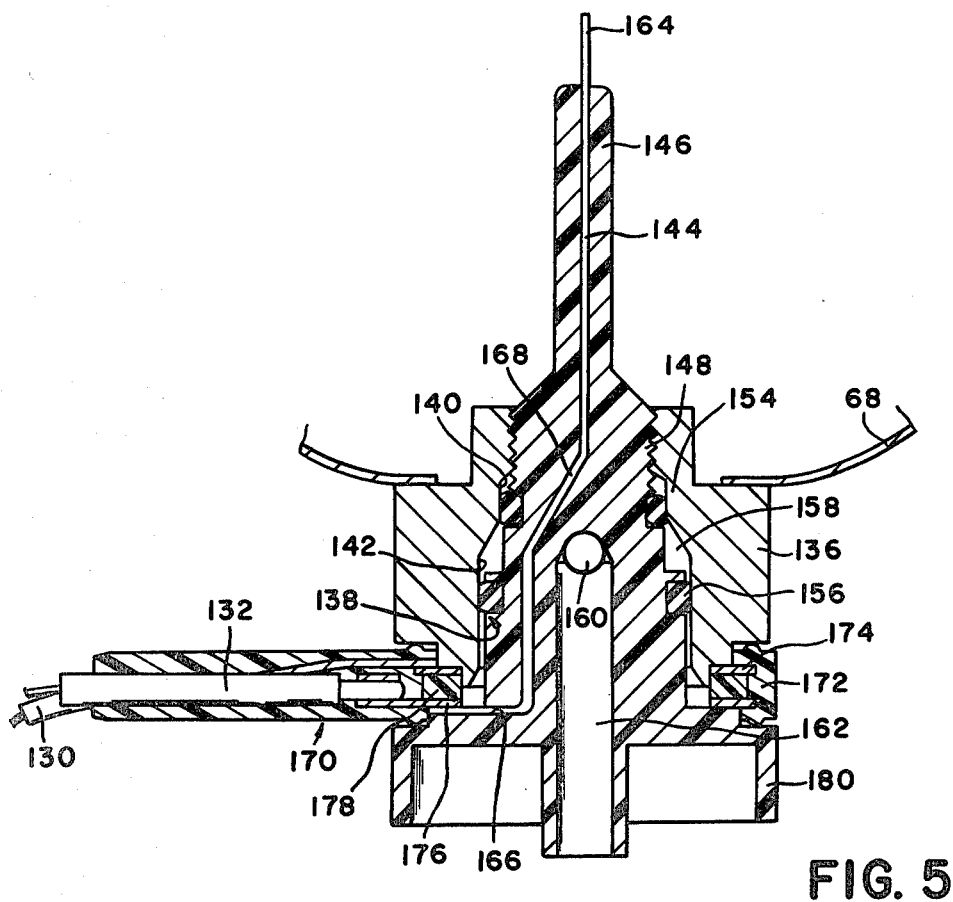
FIG. 5 is an enlarged longitudinal cross-sectional view of the circumscribed portion of FIG. 1.

The insulative housing 146 further carries axially spaced, circumferentially extending O ring seals 154, 156. The O ring seal 154 engages the smaller diameter portion 140 of the fitting 136 and the larger diameter seal 156 engages the larger diameter portion 142 of the fitting 136. The seals 154, 156 and the corresponding portions of the housing 146 and the fitting 136 cooperate to define an annular cavity 158. A radially extending passage 160 communicates the cavity 158 with an axially extending passage 162 which extends through the lower portion (viewing FIG. 5) of the housing 146. One end 164 of the corresponding end of the housing 146 to be exposed to the liquid content in the sump 98, and the other end of the probe 144 terminates in a transversely projecting portion 166. The probe 144 also includes an intermediate portion 168 which is separated from the radial passage 160 and longitudinal passage 162.

A terminal assembly generally indicated by the numeral 170 connects the conductors 130, 132 with the probe assembly. The terminal assembly includes a circumferentially extending portion 172 which circumscribes the fitting 136 and housing 146. A pair of axially spaced rings or contact means 174, 176 are carried in the circumferentially extending ring-like portion 172 of terminal assembly 170, and circumscribe the housing 146. The ring 174 is exposed for electrical engagement with the fitting 136, and a block of electrically insulative material 178 isolates the ring 174 from the ring 176. The ring 176 is connected to the conductor 132, and is exposed for electrical contact with the transversely projecting portion 166 of the probe 144. As can most clearly be seen in FIG. 5, the ring 176 will be in electrical contact with the transversely projecting portion 166 regardless of the angular orientation of the projecting portion 166 that the housing 146 can be rotated relative to the terminal 170 as described hereinafter.

In operation, the inlet and outlet fittings 16, 18 of the separating device 10 are installed in an appropriate liquid flow system, such as the fuel supply system to a motor vehicle diesel engine. Liquid communicated through the inlet fitting 16 passes through the inlet passage 20 and then flows through check valves 36 and 38 into passage portion 40. Liquid then flows from passage portion 40 into the duct 52. When the temperature of the liquid is sufficiently low, the heating discs 55, 57 heat the fuel oil to a temperature high enough to avoid the "waxing" problem, as will be hereinafter described. The liquid mixture then flows from the heating element 46 into the annular chamber 54 through the aforementioned openings (not shown) in support plate 56. Liquid in the annular chamber 54 is communicated through the openings 78 into the cartridge 14. Liquid in the cartridge is deflected by the end cap 90 into the annular chamber 96. The liquid mixture then passes into the coalescing medium 82. Flow of liquid through the coalescing medium 82 causes the liquid to be separated out of the mixture, such as water from a mixture of fuel oil and water, to agglomerate into water droplets. As these water droplets appear on the inner screen 88 of the coalescing medium 82, gravity causes most of the particles to fall into the sump 98. The liquid mixture, now relieved of at least some of the water or other liquid component to be removed, now flows around the end of the impervious baffle 122. The baffle 122 assures that the liquid flow reverses direction before entering the separating medium 102. This reversal of direction, from the generally downwardly movement viewing FIG. 1 of the liquid mixture from the openings 78 through the chamber 96 and the coalescing medium 82 to the generally upwardly flow of the liquid mixture into the separating cartridge 102, further encourages any droplets of the heavier component (such as water) that is to be removed from the mixture to fall into the sump. The membrane 106 of the separating medium 102 is repellent to, for example, water, so that any of the water droplets remaining in the liquid mixture will collect on the surface of the membrane and, because of the conical shape of the membrane, will tend to drain downwardly viewing FIG. 1 into the sump 98. The liquid, now relieved of the liquid component removed by the separator, then flows through the threaded stud 62 into the passage 58 and out of the outlet fitting 18.

The liquid component removed from the liquid mixture by the separating device 10 will gradually fill the sump 98. The sump 98 is initially filled with the liquid mixture which, in the case of a mixture of fuel oil and water in which the water contaminant makes up only a very small percentage of the total mixture, the conductivity of the mixture is such that a high impedence circuit will exist between the projecting portion 164 of the probe and the grounded fitting 136, so that a high impedance circuit between the conductors 130, 132 is present. Accordingly, the aforementioned dashboard light (not shown) will be turned off. However, as water is removed from the liquid mixture and fills the sump 98, the impedence of the electrical circuit between the probe 144 and the fitting 136 will be abruptly reduced when the level of the water reaches the projecting portion 164. When this occurs, the dashboard light is turned on through a conventional control circuit (not shown) which responds to the change of impedence. Accordingly, the vehicle operator is warned that the sump 98 must be drained. Draining the sump 98 is accomplished by manipulating the portion 180 of the probe assembly to unscrew the housing 146 from the fitting 136 until the O ring seal 154 is moved out of the smaller diameter portion 140 of the bore 138 and into the larger diameter portion 142 of the latter. When this occurs, water in the sump 98 drains into the circumferentially extending cavity 158. The O ring seal 156 protects the connection between the probe transversely extending portion 166 from water contamination. Water in the cavity 158 drains through radially extending passages 160 and axially extending passage 162 to the exterior of the separator 10.

The sump 98 may be purged of water without introducing air into the system by first opening the drain as described hereinabove and by then manipulating the plunger 32 of the primer pump 24, to thereby force the liquid mixture from the inlet fitting 16 into the cartridge 14, to thereby displace the water through the open drain. The primer pump 24 operates in the normal manner, in which upward movement of the plunger 32 due to the spring 34 creates a partial vacuum in the pumping chamber 22, thereby drawing liquid into the pumping chamber 22 through the inlet fitting 16 and the check valve 36. Since no air is introduced into the system, vent 60 remains closed. When the plunger is pushed downwardly viewing FIG. 1, the fluid content of the pumping chamber 22 is expelled into the passage portion 40 through the check valve 38.

From time to time the media within the cartridge 14 lose their effectiveness and must be replaced. Accordingly, the cartridge 14 must then be removed from the housing 12 and replaced with a new cartridge. Removal of the cartridge is accomplished by unscrewing the housing 146 from the fitting 136 so that the probe assembly 128 is entirely removed from the fitting 136. The terminal assembly 170 is held onto the fitting 136 by the probe assembly and is removed with it. The entire cartridge 14 is then removed from the threaded stud 62 in the conventional manner. A new cartridge 14 is then installed on the stud 62 and tightened until the circumferentially extending seal 76 sealingly engages the housing 12. The portion 116 of the seal 114 is forced over the end of the stud 62 when the cartridge 14 is installed thereon and automatically engages the outer circumferential surface of the stud 62 to form a sealing connection therewith. The probe housing 146 and terminal assembly 170 are then installed on the fitting 136 on the new cartridge by screwing the housing 146 back into fitting 136 by rotating fitting 136 relative to the terminal 170. When the cartridge is installed on the housing, the air in the cartridge must be purged so that when the separating device is used in the fuel supply system of a diesel engine, the air in the cartridge will not be communicated to the engine to cause problems. Accordingly, the primer pump 24 is operated to pump fluid from the inlet fitting 16 into the new cartridge 14. As the cartridge 14 fills with the liquid mixture, the mixture eventually will begin coming out of the vent 60. At that time, the vent 60 is closed.

As discussed hereinabove, diesel fuel exhibits a phenomena known as "waxing" when it is cooled to a predetermined level. When waxing occurs, wax crystals form due to the paraffin in diesel fuels. These wax crystals in the diesel fuel cause problems when they are communicated through any filter or separator in the fuel line, because the wax crystals tend to act as a contaminant that plugs the filter or separating media thereby causing a fuel blockage or diminished flow through the filter or separating device. Although prior art fuel oil heaters have been used, they are relatively ineffective in preventing wax crystals from clogging the filter, because the heaters are only effective for the fuel in the area where the heater is installed. If the fuel filter/separator is blocked due to waxing, the heater is not effective because there is no way to communicate heated fuel oil through the filter/separator. Referring to FIG. 1, the batt of loosely packed fibrous filtering medium 100 which circumscribes the coalescing medium 84 tends to collect wax crystals on the fibers. Since the medium 100 is much less dense than is the medium 84, the wax crystals tending to collect on the fibers do not span the open pores of the batt-like material 100, thus protecting the tighter and more dense coalescing medium 84 from plugging during initial flow through the filter. When the pressure differential across the separator medium 102 becomes sufficiently great, such as would occur during wax crystals plugging the separating membrane, the relief valve 110 opens to permit fuel flow to bypass the waxed separator membrane 106. Accordingly, fuel flow through the cartridge is permitted, thereby permitting the heater 46 to heat the fuel flow and to permit the heated fuel flow to pass to the cartridge 14. Of course, the relief valve closes when the pressure level drops to an acceptable level due to the operation of the heater dissolving the wax crystals in the fuel.

We claim:

1. Probe and drain assembly comprising a fitting for attachment to the wall of a sump, a probe assembly engaged with said fitting, said probe assembly comprising an electrically conductive probe and an insulating housing, a fluid passage through said probe assembly for providing a fluid flowpath through said assembly from the sump, and a terminal assembly for providing an electrical connection with said probe, said terminal assembly including a portion circumscribing said probe assembly, an electrical lead carried by said portion, and contact means carried by said portion for providing an electrical connection between the lead and the probe while permitting relative rotation between the probe assembly and the terminal assembly, said fluid flowpath including a passage defined between said probe assembly and said fitting, said probe assembly being movable in said fitting to open and close said passage.

2. Probe and drain assembly comprising a fitting for attachment to the wall of a sump, a probe assembly engaged with said fitting, said probe assembly comprising an electrically conductive probe and an insulating housing, a fluid passage through said probe assembly for providing a fluid flowpath through said assembly from the sump, and a terminal assembly for providing an electrical connection with said probe, said terminal assembly including a portion circumscribing said probe assembly, an electrical lead carried by said portion, and contact means carried by said portion for providing an electrical connection between the lead and the probe while permitting relative rotation between the probe assembly and the terminal assembly, one end of said probe projecting from said insulating housing to be exposed to the content of said sump, the other end of said probe terminating in a transversely projecting portion, said contact means providing an electrical connection with said transversely projecting portion independently of the angular position of the transversely projecting portion.

3. Probe and drain assembly as claimed in claim 2, wherein said contact means includes a ring of electrically conductive material carried in said circumscribing portion of the terminal assembly, said ring engaging the transversely extending portion of said probe.

4. Probe and drain assembly as claimed in claim 2, wherein said contact means includes a pair of rings of electrically conductive material carried in said circumscribing portion of said terminal assembly, said rings being axially separated and electrically insulated from one another, one of said rings being in electrical contact with said transversely projecting portion of said probe but rotatable relative thereto, the other ring being in electrical contact with and rotatable relative to said fitting, said lead carrying a pair of conductors, one of said conductors being connected to said one ring, the other conductor being connected to the other ring.

5. Probe and drain assembly comprising a fitting for attachment to the wall of a sump, a probe assembly engaged with said fitting, said probe assembly comprising an electrically conductive probe and an insulating housing, a fluid passage through said probe assembly for providing a fluid flowpath through said assembly from the sump, and a terminal assembly for providing an electrical connection with said probe, said terminal assembly including a portion circumscribing said probe assembly, an electrical lead carried by said portion, and contact means carried by said portion for providing an electrical connection between the lead and the probe while permitting relative rotation between the probe assembly and the terminal assembly, said fitting having larger and smaller diameter sections, said probe assembly being mounted in said bore and cooperating with the larger and smaller sections thereof to define a portion of said fluid flowpath, said probe assembly being movable with respect to the fitting to control fluid flow through the fluid flowpath.

6. Probe and drain assembly as claimed in claim 5, wherein said probe assembly is threadedly engaged with said fitting and is movable axially relative to said fitting, said fluid flowpath including grooves in the outer surface of said probe assembly bypassing said threads and said bore in the fitting, said probe assembly carrying a seal movable in and out of sealing engagement with the smaller section of said bore as said probe assembly is moved axially relative to the fitting to control fluid flow through said fluid flowpath.

* * * * *